United States Patent
Yoshida et al.

(10) Patent No.: US 8,815,022 B2
(45) Date of Patent: Aug. 26, 2014

(54) METHOD FOR SURFACE TREATING A HEAT EXCHANGER, SURFACE TREATMENT AGENT, AND ALUMINUM HEAT EXCHANGER

(75) Inventors: Tatsuo Yoshida, Tokyo (JP); Masahiko Matsukawa, Tokyo (JP); Shintaro Nakagawa, Tochigi (JP)

(73) Assignees: Nippon Paint Co., Ltd., Osaka (JP); Showa Denko K.K., Tokyo (JP)

( * ) Notice: Subject to any disclaimer, the term of this patent is extended or adjusted under 35 U.S.C. 154(b) by 749 days.

(21) Appl. No.: 13/011,457

(22) Filed: Jan. 21, 2011

(65) Prior Publication Data

US 2011/0180249 A1    Jul. 28, 2011

(30) Foreign Application Priority Data

Jan. 26, 2010   (JP) ................ 2010-014777

(51) Int. Cl.
  *C23C 22/56*  (2006.01)
  *F28F 19/02*  (2006.01)
  *F28F 19/00*  (2006.01)

(52) U.S. Cl.
  USPC ......... 148/247; 148/275; 165/133; 165/134.1

(58) Field of Classification Search
  USPC ............... 148/247, 275; 165/133, 134.1
  See application file for complete search history.

(56) References Cited

U.S. PATENT DOCUMENTS

| | | | |
|---|---|---|---|
| 5,350,445 A | 9/1994 | Mikami et al. | |
| 6,306,226 B1 | 10/2001 | Iino et al. | |
| 6,554,916 B2 | 4/2003 | Kojima et al. | |
| 2002/0040742 A1 * | 4/2002 | Kojima et al. | 148/240 |
| 2002/0042467 A1 | 4/2002 | Matsukawa et al. | |
| 2003/0037914 A1 * | 2/2003 | Inbe et al. | 165/133 |
| 2006/0027629 A1 | 2/2006 | Inbe et al. | |

FOREIGN PATENT DOCUMENTS

| | | |
|---|---|---|
| CN | 1247951 | 11/2001 |
| CN | 1323977 A | 11/2001 |
| CN | 1510167 | 7/2004 |
| JP | 5-302042 | 11/1993 |
| JP | 11-131254 | 5/1999 |
| JP | 2001-174192 | 6/2001 |
| JP | 2002-30462 | 1/2002 |
| JP | 2006069197 | 3/2006 |

OTHER PUBLICATIONS

Notice of Reasons for Rejection issued to CN Application No. CN201110025255.X, mailed Sep. 3, 2012.
Notice of Reasons for Rejection issued to CN Application No. 201110025255.X, mailed Mar. 27, 2013.
Notice of Reasons for Rejection issued to JP Application No. 2010-014777 mailed Oct. 29, 2013.

* cited by examiner

*Primary Examiner* — Lois Zheng
(74) *Attorney, Agent, or Firm* — Dilworth & Barrese, LLP.

(57) ABSTRACT

A method for surface treating a heat exchanger and an aluminum heat exchanger obtained from this method are provided that can effectively suppress the foul odor characteristic to flux that emanates following degradation of a hydrophilic coating film and a chemical conversion coating film in a non-corrosive flux brazed heat exchanger on which flux easily remains. The method for surface treating a non-corrosive flux brazed heat exchanger made of an aluminum material conducts a pickling treatment step, a chemical conversion treatment step, and a deodorizing treatment step on the heat exchanger, in which the acidic cleaning agent contains nitric acid and sulfuric acid as well as a predetermined amount of ferric salt, and the surface treatment agent contains silica grains coated by a vinyl alcohol polymer and polyallylamine resin such that the total content of the silica grains and the vinyl alcohol polymer is a predetermined amount.

3 Claims, No Drawings

METHOD FOR SURFACE TREATING A HEAT EXCHANGER, SURFACE TREATMENT AGENT, AND ALUMINUM HEAT EXCHANGER

This application is based on and claims the benefit of priority from Japanese Patent Application No. 2010-014777, filed on 26 Jan. 2010, the content of which is incorporated herein by reference.

BACKGROUND OF THE INVENTION

1. Field of the Invention

The present invention relates to a method for surface treating a heat exchanger, a surface treatment agent, and an aluminum heat exchanger.

2. Related Art

The heat exchanger portions of an air-conditioner and the heat exchanger portions of an air purification system are made in a complex structure in which aluminum fins are retained between aluminum tubes in narrow intervals in order to improve heat-transfer efficiency. For this reason, the surface of the aluminum fins are chemical conversion treated as necessary and then hydrophilized, whereby the shedding of moisture condensed during air conditioning is facilitated (e.g., refer to Japanese Unexamined Patent Application Publication No. H05-302042).

The fins and the like of the heat exchanger are often assembled by brazing an aluminum alloy. Methods of brazing can be separated into methods using and not using flux. Although the vacuum brazing method (VB method) can be exemplified as a method not using flux, and the non-corrosive flux brazing method (NB method) using a fluoride based flux can be exemplified as a method using flux, due to excelling in corrosion resistance and being low in facility cost, there has been a trend of shifting to the NB method. However, since the NB method causes the flux dissolved in water and in a slurry state to adhere to the heat exchanger, there has been a problem in that flux remains after brazing and a foul odor emanates from this.

Although it is necessary to remove residual flux in order to solve such a problem, it is difficult to completely remove the residual flux by pickling being conventionally performed as a step prior to chemical conversion treatment. For example, Japanese Unexamined Patent Application Publication No. H11-131254 discloses a method for surface treating an aluminum-containing metal material in which a chemical etching treatment is conducted with an acidic aqueous solution containing at least one selected from the group consisting of sulfuric acid, hydrofluoric acid, nitric acid and phosphoric acid prior to hydrophilizing treatment, and performing chemical conversion treatment using an aqueous solution of zirconium phosphate or titanium phosphate thereafter; however, the effect on removing deposits of residual flux and the like has not been adequate in such a method for surface treatment either. In addition, concealing the residual flux has been difficult with chemical conversion treatment after pickling.

As another method for surface treating a heat exchanger, a method has been disclosed in which a chemical conversion coating film is formed, and then a second protective layer is formed thereon composed of a hydrophilic, poorly water-soluble resin coating film including: (a) a resin component having at least one hydrophilic group selected from a primary, secondary or tertiary amino group, a quaternary ammonium group, an amide group, a carboxyl group, a sulfo group, an ethyleneoxide group, a phosphonate group, and a hydroxyl group, and a cross-linking reactive group of a different kind than the above-mentioned hydrophilic group selected, and selected from an amide group, carboxyl group and hydroxyl group; and (b) a cross-linking agent component containing (i) a trivalent-chromium compound and (ii) a fluoro complex salt in a total amount exceeding the cross-linking equivalent amount of the resin component (e.g., refer to Japanese Unexamined Patent Application Publication No. 2001-174192). However, this method was not targeted at heat exchangers prepared by the non-corrosive flux brazing method.

In addition, a method is disclosed in Japanese Unexamined Patent Application Publication No. 2002-30462 in which pickling is performed using ferric salt, a chemical conversion treatment is performed after deposits of the brazing filler material have been effectively removed, and then a hydrophilizing treatment is performed. However, the chemical conversion treatment agent used in such a method is a chromate-based chemical conversion treatment agent, which is not desirable to use, mainly from the viewpoint of the burden on the environment.

Treatment agents that make a heavy metal such a zirconium, titanium, and hafnium as the coating film forming component can be exemplified as non-chromium chemical conversion treatment agents. However, with the chemical conversion coating film obtained using the aforementioned such non-chromium chemical conversion treatment agents, such as a zirconium-based chemical conversion treatment agent in particular, there is a problem in that a uniform chemical conversion coating film cannot be formed on the brazed heat exchanger, and thus the adherence with the hydrophilic coating film obtained using a conventional hydrophilizing treatment agent is not sufficient. As a result, degradation of the hydrophilic coating film advances from repeated cooling and heating over an extended period of time, and the chemical conversion coating film also degrades accompanying the degradation of the hydrophilic coating film. The odor characteristic to the flux remaining on the surface of the heat exchanger becomes a problem due to the hydrophilic coating film and the chemical conversion coating film degrading and the surface of the heat exchanger being exposed in this way.

In particular, although there is a description in Japanese Unexamined Patent Application Publication No. 2002-30462 with regard to an odor suppressant composed of an organic substance having an amide group and/or phenol group, such an odor suppressant is used in order to suppress the odor characteristic to the chromate contained in a chromate-based chemical conversion treatment agent, and does not provide any kind of solution to the suppression of odor, characteristic to a case of performing chemical conversion treatment using a non-chromium chemical conversion treatment agent, resulting from the degradation of the hydrophilic coating film and chemical conversion coating film.

SUMMARY OF THE INVENTION

The present invention takes the above-mentioned matters into account and has an object of providing a method for surface treating a heat exchanger that can effectively suppress the odor characteristic to flux that emanates accompanying the degradation of the hydrophilic coating film and the chemical conversion coating film in a non-corrosive flux brazed heat exchanger on which flux easily remains, and an aluminum heat exchanger obtained by way of this method.

According to the present invention, a method for surface treating a heat exchanger includes: (1) a pickling treatment step of causing an acidic cleaning agent to come into contact with a non-corrosive flux brazed heat exchanger made of an aluminum material; (2) a chemical conversion treatment step of causing a zirconium-based chemical conversion treatment agent to come into contact with the aluminum material after the pickling treatment step; and (3) a deodorizing treatment step of causing a surface treatment agent to come into contact with the aluminum material after the chemical conversion treatment step, in which the acidic cleaning agent contains nitric acid and sulfuric acid, and contains 0.01 to 0.05% by mass of a ferric salt, and the surface treatment agent contains silica grains coated by a vinyl alcohol polymer, and a polyallylamine resin, a total content of the silica grains and the vinyl alcohol polymer contained in the surface treatment agent being in the range of 0.2% by mass to 25% by mass, and a mass ratio of the silica grains to the vinyl alcohol polymer being in the range of 30:70 to 70:30.

The ferric salt is preferably at least one selected from the group consisting of iron sulfate, iron nitrate, iron acetate, and iron chloride.

The above-mentioned non-corrosive flux brazed heat exchanger is preferably an evaporator for a vehicle air-conditioner.

The present invention also includes a surface treatment agent used in the above-mentioned method for surface treating a heat exchanger.

The present invention also includes an aluminum heat exchanger obtained according to the above-mentioned method for surface treating a heat exchanger.

The method for surface treating a heat exchanger according to the present invention makes it possible to maintain the adherence of a coating film exhibiting hydrophilicity on a heat exchanger surface over an extended period, by causing an acidic cleaning agent containing nitric acid and sulfuric acid and a predetermined amount of ferric salt to come into contact with a non-corrosive flux brazed heat exchanger made of an aluminum material, causing a zirconium-based chemical conversion treatment agent to come into contact therewith, and further causing a surface treatment agent containing silica grains coated by a vinyl alcohol polymer, and a poylallyamine resin to come into contact therewith, the total content and mass ratio of the vinyl alcohol polymer and silica grains being with predetermined ranges. The present invention enables the emanation of the foul odor characteristic to flux remaining on the surface of a heat exchanger to be suppressed since coating films are effectively formed on a non-corrosive flux brazed heat exchanger on which flux, which is the cause of the foul odor, has adhered, and also this coating film does not degrade over an extended time period, and thus the base material of the heat exchanger ill not be exposed.

DETAILED DESCRIPTION OF THE INVENTION

Hereinafter, the present invention will be explained in detail.

The present invention is a method for surface treating to impart preferable deodorizing property and hydrophilicity even to non-corrosive flux brazed heat exchanger. The surface treatment agent used in a deodorizing treatment step of the present invention contains silica grains coated by a vinyl alcohol polymer, and a polyallylamine resin. By using the above-mentioned surface treatment agent containing silica grains coated by a vinyl alcohol polymer, and a polyallylamine resin, it is possible to shield the flux remaining in the non-corrosive flux brazed heat exchanger over an extended period, and form/preserve a coating film excelling in odor suppressibility and hydrophilicity.

The above-mentioned polyallylamine resin is not particularly limited so long as having a constitutional unit represented by the following formula (1). The coating film having hydrophilicity will not degrade over an extended period due to the adherence of the above-mentioned polyallylamine resin. Therefore, the residual flux on the heat exchanger is shielded, whereby the emanation of a foul odor characteristic to flux is suppressed.

The polyallylamine resin has characteristics such as excelling in water-solubility and compatibility with vinyl alcohol polymers. As a result, the polyallylamine resin added to the surface treatment agent can maintain the adherence of the coating film having hydrophilicity over an extended period compared to a case of another polymer or compound having characteristics and an analogous structure including amino groups or the like, and thus effectively suppresses the emanation of the foul odor characteristic to flux.

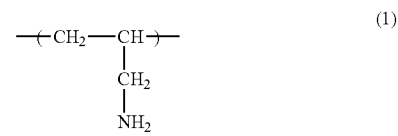

The method of preparing the above-mentioned polyallylamine resin is not particularly limited, and preparation can be carried out according to a well-known method. As the polyallylamine resin, a commercially available polyallylamine resin can be used such as "PAA-05" (polyallylamine, weight average molecular weight 5000, trade name, made by Nittobo Co., Ltd.), "PAA-15C" (polylallyamine, weight average molecular weight 15000, trade name, Nittobo Co., Ltd.), and "PAA-D11-HC11" (allylamine hydrochloride-diallylamine hydrochloride copolymer, weight average molecular weight 10000, trade name, Nittobo Co., Ltd.), without particular limitation. The polyallylamine resin can use, in a range that does not inhibit the object of the present invention, resin modified by a method such as acetylating a portion of the amino groups thereof, resin in which a portion or all of the amino groups have been neutralized with acid, and also resin cross-linked by a cross-linking agent in a range not affecting the solubility.

The above-mentioned polyallylamine resin preferably has a weight average molecular weight within the range of 5000 to 70000. If less than 5000, the uptake of the polyallylamine resin to the coating film having hydrophilicity may be insufficient, and a sufficient deodorizing effect may not be obtained, which is not preferable. If the weight average molecular weight exceeds 70000, the viscosity of the surface treatment agent will increase, and the coating film formation may be inhibited. The above-mentioned lower limit is more preferably 10000, and the above-mentioned upper limit is more preferably 25000. It should be noted that the above-mentioned weight average molecular weight is a value measured by GPC method based on styrene polymer.

The content of the above-mentioned polyallylamine resin in the surface treatment agent is preferably within the range of 100 ppm to 5000 ppm by solid content. If less than 100 ppm, there is a possibility that sufficient deodorizing effect will not be obtained, which is not preferable. If the content exceeds 5000 ppm, the viscosity of the surface treatment agent will increase, the coating film formation may be inhibited, and also the odor characteristic to polyallylamine resin may become a problem. The above-mentioned lower limit is more preferably 300 ppm, and the above-mentioned upper limit is more preferably 1000 ppm.

The surface treatment agent used in the present invention further contains silica grains coated with vinyl alcohol polymer. The silica grains have a function of raising the hydrophilicity of the coating film that is obtained from the uneven shape thereof. Furthermore, by the silica grains being coated by the vinyl alcohol polymer, a foul odor from exposure of the silica is suppressed and hydrophilicity can be maintained over an extended period.

The above-mentioned silica grains are not particularly limited, and can be exemplified by fumed silica, colloidal silica, and the like. The above-mentioned fumed silica is prepared by high temperature hydrolysis of a halosilane such as trichlorosilane and tetrachlorosilane in the gas phase, and are fine grains having high surface area. The above-mentioned colloidal silica is made by dispersing acid- or alkali-stable silica sol in water. The average grain size of the silica grains is preferably within the range of 5 nm to 100 nm. The above-mentioned lower limit is more preferably 7 nm, and the above-mentioned upper limit is more preferably 60 nm. If the above-mentioned average grain size is less than 5 nm, the unevenness of the coating film formed with the surface treatment will be lacking and the hydrophilicity will decline. If exceeding 100 nm, aggregates of a large grain size will generate in the surface treatment agent, and the coating workability will decline. It should be noted that the average grain size referred to herein indicates the grain size at the point at which the accumulation curve is 50% when obtaining the accumulation curve with the total volume of the silica grains as 100%. The average grain size is measured by a dynamic light scattering method.

The above-mentioned silica grains are coated by a vinyl alcohol polymer. Although the vinyl alcohol polymer is not particularly limited, an at least 90% saponified vinyl alcohol polymer is preferred above all. If the degree of saponification is less than 90%, the hydrophilicity may be inferior. The degree of saponification is more preferably at least 95%. The vinyl alcohol-based polymer may be partially denatured such as carboxylic acid denatured, silicon denatured, amine denatured, and thiol denatured. In addition, the vinyl alcohol-based polymer preferably has a degree of polymerization in the range of 300 to 1500, and more preferably in the range of 500 to 1300.

The mass ratio of silica grains to vinyl alcohol-based polymer (silica grains:vinyl alcohol polymer coating silica grains) in the silica grains coated by the vinyl alcohol polymer is within the range of 30:70 to 70:30. The silica grains can be effectively coated, and thus exposure of the silica grains suppressed by setting to within the above-mentioned range. In addition, the average grain size of the silica grains coated by the above-mentioned vinyl alcohol polymer preferably is within the range of 5 nm to 1000 nm. The coated state of the silica fine grains coated by the vinyl alcohol polymer is made favorable and the emanation of a foul odor due to silica grains being exposed is effectively suppressed, by the mass ratio of silica grains to vinyl alcohol polymer and the average grain size of the silica fine grains coated by the vinyl alcohol polymer being within the above-mentioned ranges.

The method for preparing the silica grains coated by the above-mentioned vinyl alcohol-based polymer is not particularly limited, and can be exemplified by a method of dispersing silica grains in a vinyl alcohol-based polymer aqueous solution. Herein, in a case of mixing the vinyl alcohol-based polymer and the silica grains, both agglomerate due to interactions. The silica grains coated by the vinyl alcohol-based polymer can be prepared by causing the aggregate aggregated in this way to forcibly disperse by way of an ultrasonic disintegrator, micro medium disperser, or the like. It should be noted that the aggregate cannot be sufficiently dispersed with a mixer or the like merely having an agitation function, and it is necessary to use a disperser having a crushing function such as of a mill, or having an intense agitating effect in a minute fraction such as ultrasonic waves. As specific examples of such a disperser, for example, an ultrasonic homogenizer (US series) made by Nippon Seiki Seisakusho and a super mill (HM-15) made by Inoue Seisakusho can be exemplified. By forcibly dispersing in such a way, the agglomerated state with the vinyl alcohol-based polymer is released, and the silica grains become suitable grains in a coated state in which the surface of individual grains is coated by the vinyl alcohol polymer. As a result thereof, the silica grains come to stably exist as a dispersion in an aqueous medium.

The above-mentioned surface treatment agent may include a hydrophilic resin other than the above-mentioned polyallylamine resin and vinyl alcohol-based polymer. A conventional well-known hydrophilic resin can be used as such a hydrophilic resin without particular limitation, and can be exemplified by a water soluble or water dispersible hydrophilic resin having a hydroxyl group, carboxyl group, amide group, amino group, sulfonate group, and/or ether group, for example. Above all, from the viewpoint of the coating film formed by the hydrophilization treatment showing favorable hydrophilicity, polyvinyl pyrrolidone, polyacrylic acid, polystyrene sulfonic acid, polyacrylamide, carboxymethyl cellulose, polyethylene oxide, water-soluble nylon, a copolymer of the monomers forming these polymers, an acrylic polymer having polyoxyethylene chains such as 2-methoxy polyethylene glycol methacrylate/2-hydroxyethyl acrylate copolymer are preferable as the above-mentioned hydrophilic resin.

These hydrophilic resins have superior hydrophilicity and water resistance, while having no foul odor themselves and not easily adsorbing odorants. As a result, a coating film formed from a surface treatment agent including these hydrophilic resins does not easily degrade, even if exposed to drops of water or running water, and thus an inorganic substance such as silica or other residual monomer components, which emanate dust or the unpleasant odor of the adsorbed material, do not easily become exposed at the surface of the coating film. The treated material is suppressed from scattering and emanating dust and from corroding.

The total content of silica grains and vinyl alcohol polymer in the above-mentioned surface treatment agent is within the range of 0.2% by mass to 25% by mass. If the total content is less than 0.2% by mass, sufficient film formation of the surface treatment agent and sufficient hydrophilicity of the film thus formed may not be obtained. If the total content exceeds 25% by mass, the surface treatment agent will easy aggregate, and the workability and the coating film properties will be inferior. The above-mentioned lower limit is more preferably 1% by mass, and the above-mentioned upper limit is more preferably 20% by mass.

Although the solvent of the surface treatment agent of the present invention is not particularly limited, it is preferably mainly water from the viewpoint of fluid waste disposal and the like. In addition, it may be jointly used with a solvent in order to improve film formation of the surface treatment agent, and form a smooth film more uniformly. The solvent is not particularly limited so long as being generally used in paints and being able to mix uniformly with water, and can be exemplified by an organic solvent of an alcohol system, a ketone system, ester system, ether system, or the like. The amount of the above-mentioned solvent used is preferably within the range of 0.01% by mass to 5% by mass relative to the surface treatment agent of the present invention.

The surface treatment agent of the present invention may further contain other additives. The above other additives are not particularly limited, and can be exemplified by a hardener, dispersant, anti-corrosion additive, antibacterial agent, odor suppressant, pigment, surfactant, lubricant, deodorizer, or the like.

The above-mentioned hardener is not particularly limited, and can be exemplified by an epoxy compound, dialdehyde compound, phenolic compound, urethane compound, and the like.

The dispersant is not particularly limited, and can be exemplified by a surfactant, dispersed resin, and the like.

The above-mentioned anti-corrosion additive is not particularly limited, and can be exemplified by tannic acid, imidazole compound, triazine compound, triazole compound, guanine compound, hydrazine compound, zirconium compound, and the like. Above all, a zirconium compound is preferable due to being able to effectively impart the anti-corrosion property. The zirconium compound is not particularly limited, and can be exemplified by an alkali metal fluorozirconate such as $K_2ZrF_6$; a fluorozirconate such as $(NH_4)_2ZrF_6$; a soluble fluorozirconate such as a fluorozirconic acid such as $H_2ZrF_6$; zirconium fluoride; zirconium oxide; and the like.

The above-mentioned antibacterial agent is not particularly limited, and can be exemplified by zinc pyrithione, 2-(4-thiazoryl)-benzimidazole, 1,2-benzisothiazoline, 2-n-octyl-4-isothiazoline-3-on, N-(fluorodichloromethylthio) phthalimide, N,N-dimethyl-N'-phenol-N'-fluorodichloromethylthio)-sulfamide, methyl 2-benzimidazolecarbamate, bis(dimethylthiocarbamoyl)-disulfide,N-(trichloromethylthio)-4-cyclohexane-1,2-dicarboxylmide, barium metaborate, and the like. The above-mentioned antibacterial agent can exhibit an effect by being added to the surface treatment agent so as to make a concentration of at least 10 ppm.

The above-mentioned odor suppressant is not particularly limited, and can be exemplified by an organic substance having an amide group and/or phenol group. These odor suppressants can suppress the foul odor of a chromate characteristic when using a chromate-based chemical conversion treatment agent in particular. As a result, there is no necessity to have these odor suppressants contained in so far as performing chemical conversion treatment using a non-chromium chemical treatment agent such as a zirconium-based chemical conversion treatment agent.

The above-mentioned organic substance having an amide group and/or phenol group can be exemplified by a water-soluble polyamides, flavonoids, aqueous phenols, hydrazine derivatives (e.g., carbodihydrazides, hydrazide adipate, hydrazide sebacate, hydrazide didodecate, hydrazide isophthalate, 1,6-hexamethylenebis(N,N'-dimethylsemicarbazide), 1,1,1',1'-tetramethyl-4,4'(methylene-di-p-phenylene) di-semicarbazide, and the like.

The above-mentioned pigment can be exemplified by various color pigments such as inorganic pigments and organic pigments such as titanium oxide ($TiO_2$), zinc oxide (ZnO), zirconium oxide (ZrO), calcium carbonate ($CaCO_3$), barium sulfate ($BaSO_4$), alumina ($Al_2O_3$), kaolin clay, carbon black, ferric oxide ($Fe_2O_3$, $Fe_3O_4$) and aluminum oxide ($Al_2O_3$).

The method for preparing the above-mentioned surface treatment agent can be exemplified by a method of preparing silica grains coated by vinyl alcohol polymer in advance, performing concentration adjustment by adding a hydrophilic resin aqueous solution thereafter, and further adding polyallylamine resin.

The method for applying the above-mentioned surface treatment agent can be exemplified by an immersion method, spray method, and the like.

For the film thickness of the coating film, the amount of coating film is preferably within the range of 0.1 $g/m^2$ to 3 $g/m^2$. The above-mentioned upper limit is more preferably 1 $g/m^2$. A case of the film thickness of the coating film being less than 0.1 $g/m^2$ is not preferable because the odor suppressibility of the coating film thus obtained may be insufficient.

The method for surface treating a heat exchanger according to the present invention is applied to a non-corrosive flux brazed heat exchanger made of an aluminum material to which flux, which is the origin of a foul odor, easily adheres. The above-mentioned non-corrosive flux brazed heat exchanger is a heat exchanger in which the aluminum base material such as of the aluminum fins and aluminum tubes is brazed by the non-corrosive flux brazing method. An evaporator for a vehicle air-conditioner can be exemplified as an application of the above-mentioned non-corrosive flux brazed heat exchanger.

Herein, the aluminum base material is not limited in so far as being a material made from aluminum and/or aluminum alloy, and can be exemplified by 3000 series aluminum alloy, 4000 series aluminum alloy, and the like. An aluminum heat exchanger obtained by the above-mentioned method for surface treating a heat exchanger is also included in the present invention.

The method for surface treating a heat exchanger according to the present invention has a chemical conversion treatment step prior to the above-mentioned deodorizing treatment step. The chemical conversion treatment step is a step of forming a chemical conversion coating film with the chemical conversion treatment agent on the surface of the non-corrosive flux brazed heat exchanger in order to impart corrosion resistance to the heat exchanger. From the viewpoint of the burden on the environment and the effect of imparting superior corrosion resistance, the chemical conversion treatment agent used in the chemical conversion treatment step is preferably a zirconium-based chemical conversion treatment agent with zirconium as the coating film forming component.

Herein, in a case of performing chemical conversion treatment on a brazed heat exchanger using a conventional chromate-based chemical conversion treatment agent, the adherence between the heat exchanger through the chemical conversion coating film and the coating film having hydrophilicity is adequately retained over an extended period since a favorable chemical conversion coating film is formed.

However, as stated previously, in a case of using a zirconium-based chemical conversion treatment agent in consideration of the environment, a suitable chemical conversion coating film may not be formed on a brazed heat exchanger, in which case, the adherence of the coating film having hydrophilicity to the heat exchanger will not be retained over an extended period. As a result, there has been a problem in that the coating film having hydrophilicity and the chemical conversion coating film will degrade, the surface of the heat exchanger will be exposed, and the foul odor characteristic to flux remaining on the heat exchanger surface will emanate.

According to the method for surface treating a heat exchanger using the surface treatment agent of the present invention, it is possible to maintain the adherence of the coating film having hydrophilicity over an extended period even in a case of using a chromate-based chemical conversion treatment agent, and furthermore, the adherence of the coating film having hydrophilicity is remarkably improved compared to a conventional hydrophilizing treatment agent in particular, and this property is maintained over an extended period in a case of using a non-chromium chemical conversion treatment agent such as a zirconium-based chemical conversion treatment agent. As a result, since the coated state of the surface of the heat exchanger can be maintained over an extended period, it is possible to effectively suppress the foul odor characteristic to flux from emanating from a non-corrosive flux brazed heat exchanger.

Herein, the supply source of the zirconium in the zirconium-based chemical conversion treatment agent is not particularly limited, and can be exemplified by an alkali metal fluorozirconate such as $K_2ZrF_6$; a fluorozirconate such as $(NH_4)_2ZrF_6$; a soluble fluorozirconate such as a fluorozirconic acid such as $H_2ZrF_6$; zirconium fluoride; zirconium oxide; and the like.

The content of zirconium in the above-mentioned zirconium-based treatment agents is preferably within the range of 20 ppm to 10000 ppm as a metal ion concentration. If the content is less than the above-mentioned lower limit, the performance of chemical conversion coating film obtained may be insufficient. If the content exceeds the above-mentioned upper limit, the effect of being over this content may be undesirable and become economically disadvantageous. The above-mentioned lower limit is more preferably 50 ppm, and the above-mentioned upper limit is more preferably 2000 ppm. The zirconium-based treatment agent may include an acid such as phosphoric acid, manganic acid, permanganic acid, vanadic acid, tungstic acid, and molybdic acid.

The pH of the above-mentioned zirconium-based chemical conversion treatment agent is preferably within the range of 2.0 to 6.5. If the pH is less than 2.0, the etching may be excessive and adequate coating film formation may not be possible. If the pH exceeds 6.5, the etching may be insufficient, and an adequate coating film may not be obtained. The above-mentioned lower limit is more preferably 3.0, and the above-mentioned upper limit is more preferably 5.5. An acidic compound such as nitric acid and sulfuric acid or a basic compound such as sodium hydroxide, potassium hydroxide and ammonia can be used in order to adjust the pH.

The chemical conversion treatment step with the above-mentioned zirconium-based treatment agent is not particularly limited, and can be performed by causing the treatment agent and the coating surface to come into contact under normal treatment conditions. The treatment temperature in the above-mentioned chemical conversion treatment step is preferably within the range of 20° C. to 80° C. The above-mentioned lower limit is more preferably 30° C., and the above-mentioned upper limit is more preferably 70° C. The chemical conversion treatment time of the above-mentioned chemical conversion treatment is preferably within the range of 5 to 1200 seconds. The above-mentioned lower limit is more preferably 30 seconds, and the above-mentioned upper limit is more preferably 120 seconds. The chemical conversion treatment method is not particularly limited, and can be exemplified by an immersion method, spray method, and the like.

The method for surface treating a heat exchanger according to the present invention preferably includes a water rinsing treatment step after the above-mentioned chemical conversion treatment step. This water rinsing treatment step after chemical conversion is performed one or more times in order to make it so that the adherence with the coating film thus obtained from the deodorizing treatment step thereafter is not adversely affected. In this case, it is appropriate to perform the final water rinsing with purified water. Either spray rinsing or immersion rinsing may be applied in this water rinsing treatment after chemical conversion, or rinsing can be performing by combining these methods.

In the method for surface treating a heat exchanger according to the present invention, it is not absolutely necessary for there to be a drying step after the above-mentioned water rinsing treatment step after chemical conversion. Even if the deodorizing treatment step were performed with the chemical conversion coating film in a wet state without performing a drying step, there would be no influence on the performance thus obtained. In addition, in a case of performing a drying step, it is preferable to perform cold-air drying, hot-air drying, or the like. In a case of performing hot-air drying, it is preferably at no more than 300° C. from the viewpoint of thermal energy savings.

The method for surface treating a heat exchanger according to the present invention includes a pickling treatment step prior to the above-mentioned chemical conversion treatment step. The pickling treatment step is a step of removing impurities such as deposits of the flux, salts, etc. adhered to the heat exchanger using an acidic cleaning agent. The above-mentioned acidic cleaning agent contains nitric acid and sulfuric acid, as well as ferric salt. It should be noted that it is preferable to jointly use nitric acid and sulfuric acid in this case. The acid concentration is preferably 1 to 10 N, and more preferably 3 to 6 N. In addition, there is the advantage in performing treatment in this way in that the removal of flux and the like is more effectively performed with a acidic cleaning agent containing the above-mentioned ferric salt.

The above-mentioned ferric salt is not particularly limited, and can be exemplified by iron sulfate, iron nitrate, iron acetate, iron chloride, iron citrate, iron fluoride, iron bromide, iron phosphate, iron sulfamate, iron oxalate, iron lactate, and the like; however, at least one selected from the group consisting of iron sulfate, iron nitrate, iron acetate, and iron chloride is preferable due to being low cost. The ferric salt is preferably contained in the above-mentioned acidic cleaning agent within the range of 0.01% by mass to 5% by mass. Flux and the like can be more effectively removed by setting the content of ferric salt to within the above-mentioned range. The above-mentioned lower limit is more preferably 0.1% by mass, and the above-mentioned upper limit is more preferably 1% by mass.

The pH of the above-mentioned acidic cleaning agent is preferably no more than 4. A favorable cleaning effect can be obtained by setting the pH to no more than 4.

The above-mentioned pickling treatment step can be performed by a conventionally known method such as a spray method or immersion method. The pickling treatment step is preferably performed at a liquid temperature of the acidic cleaning agent in the range of 10° C. to 85° C. In addition, the treatment time is preferably in the range of 30 seconds to 5 minutes. If the liquid temperature is less than 10° C. or the treatment time is less than 30 seconds, the removal of deposits and the like may be insufficient, and if 85° C. is exceeded or 5 minutes is exceeded, the etching may be excessive.

EXAMPLES

Next, the present invention will be further explained more specifically giving Examples and Comparative Examples. The present invention is not to be limited to only these examples. In addition, in the examples, "%" indicates "% by mass" and "parts" indicates "parts by mass" unless otherwise noted.

Example 1

Preparation of Surface Treatment Agent

Aggregates were formed by adding 25 parts by mass of fumed silica (average grain size 40 nm) into an aqueous solution in which 25 parts by mass of vinyl alcohol-based polymer (degree of saponification of at least 98%) fine powder had been dissolved in 950 parts by mass of purified water, and agitating. Next, a dispersed solution of vinyl alcohol polymer coated silica grains with an average grain size of 500 nm was obtained by forcibly causing these aggregates to disperse using an ultrasonic disintegrator (ultrasonic homogenizer made by Nippon Seiki Seisakusho). A surface treatment agent was obtained by further adding zinc pyrithione as an antibacterial agent into this aqueous medium so as to make a concentration of 10 ppm, and further adding 500 ppm of "PAA-15C" (polylallylamine, weight average molecular weight 15000, trade name, Nittobo Co., Ltd.) as a polyallylamine resin. It should be noted that a portion of the surface treatment agent thus obtained was diluted with deionized water and the average grain size was measured with a dynamic light scattering instrument ("ELS-800", trade name, Otsuka Electronics Co., Ltd.).

Using an acidic cleaning agent containing 10% by mass nitric acid, 5% by mass sulfuric acid, and 1% by mass iron, "5000 series aluminum" (trade name, made by Nippon Testpanel Co., Ltd., 70 mm×150 mm×0.8 mm) and a non-corrosive flux brazed evaporator for a vehicle air-conditioner (NB evaporator) made by Showa Denko Co., Ltd. were immersed for 4 minutes in a bath in which this acidic cleaning agent was warmed to 65° C., extracted therefrom, and then thoroughly washed with tap water. Furthermore, this test piece and the evaporator for a vehicle air-conditioner were immersed for 90 seconds in a bath in which a zirconium-based chemical conversion treatment agent ("Alsurf 90", trade name, Nippon Paint Co., Ltd.), which is a non-chromium chemical conversion treatment agent, was warmed to 50° C., and subsequently thoroughly washed with tap water.

Next, this test piece and evaporator for a vehicle air-conditioner were immersed for 1 minute in a 20° C. bath of the above-mentioned surface treatment agent, extracted, and then dried by heating for 45 minutes at a reached temperature of 170° C., thereby completing a deodorization treated test piece and a deodorization treated evaporator for a vehicle air-conditioner with a coating film in the amount of 1 g/m$^2$.

Example 2

A deodorization treated test piece and a deodorization treated evaporator for a vehicle air-conditioner were completed similarly to Example 1 except for changing the blended amount of polyallylamine to 1000 ppm.

Example 3

A deodorization treated test piece and a deodorization treated evaporator for a vehicle air-conditioner were completed similarly to Example 1 except for changing the blended amount of polyallylamine to 5000 ppm.

Comparative Example 1

A deodorization treated test piece and deodorization treated evaporator for a vehicle air-conditioner were completed similarly to Example 1 except for not having blended polyallylamine.

Comparative Example 2

A deodorization treated test piece and a deodorization treated evaporator for a vehicle air-conditioner were completed similarly to Example 1 except for blending 1000 ppm of "PVAM0595B" (polyvinylamine, weight average molecular weight 60000, trade name, made by Mitsubishi Chemical Corporation) as a resin having amino groups, in place of polyallylamine.

Comparative Example 3

A deodorization treated test piece and a deodorization treated evaporator for a vehicle air-conditioner were completed similarly to Example 1 except for blending 1000 ppm of glycine, in place of polyallylamine.

Comparative Example 4

A deodorization treated test piece and a deodorization treated evaporator for a vehicle air-conditioner were completed similarly to Example 1 except for blending 1000 ppm of phenol, which is an odor suppressant used in a case of using a chromate-based chemical conversion treatment agent, in place of polyallylamine.

Comparative Example 5

A deodorization treated test piece and a deodorization treated evaporator for a vehicle air-conditioner were completed similarly to Example 1 except for blending 1000 ppm of hydrazide adipate, which is an odor suppressant used in a case of using a chromate-based chemical conversion treatment agent, in place of polyallylamine.

Reference Example 1

A deodorization treated test piece was created similarly to Comparative Example 1. A deodorization treated evaporator for a vehicle air-conditioner was completed similarly to Comparative Example 1 except for using an evaporator for a vehicle air-conditioner (VB evaporator) made by Showa Denko Co., Ltd. and manufactured by a vacuum brazing method in place of the evaporator for the non-corrosive flux brazed vehicle air-conditioner (NB evaporator) made by Showa Denko Co., Ltd.

Adherence

Cellophane tape (made by Nichiban) was affixed and peeled off each of initial articles of the deodorization treated test pieces thus obtained and deodorization treated test pieces caused to degrade by immersing for one week in room-temperature purified water. The surface area of the remaining coating film was measured, and evaluated with the following criterion. The results are shown in Table 1.

A: 0% peeled off
B: 50% peeled off or less
C: 50-100% peeled off

Hydrophilicity

Adhesive tape was affixed and peeled off each of the initial articles of the deodorization treated test pieces thus obtained and the deodorization treated test pieces caused to degrade by immersing for one week in room-temperature purified water. 2 µL of purified water were placed on the tape detached portions, and the contact angle was measured. The measurements of contact angle were carried out using a "CA-Z" automatic contact angle meter (made by Kyowa Interface Science Co., Ltd.). It should be noted that the 30° or less in the hydrophilicity evaluation are passing.

Odor

The odor for each of the initial articles of the evaporator for a vehicle air-condition and an evaporator for a vehicle air-conditioner caused to degrade by immersing in water for 168 hours was evaluated in five stages by smelling. It should be noted that two points or less in the odor evaluation are passing.

0 ... points no odor
1 ... point faint odor
2 ... points easily detectable odor
3 ... points obvious odor
4 ... points strong odor
5 ... points very strong odor The above results are shown in Table 2.

lem of odor suppressibility of a non-corrosive flux brazed heat exchanger. It should be noted that, since the flux remaining on the surface of a non-corrosive flux brazed evaporator for a vehicle air-conditioner has hydrophilicity, even if the coating film having hydrophilicity peels off, it will have favorable hydrophilicity compared to an evaporator for a vehicle air-conditioner manufactured by a vacuum brazing method. However, even in such a case, since the base material of the aluminum material on which the flux remains becomes exposed in Comparative Example 1, it is believed that the

TABLE 1

| | HEAT EXCHANGER | PICKLING TREATMENT | CHEMICAL CONVERSION TREATMENT | ADDITIVE OF SURFACE TREATMENT AGENT | | |
|---|---|---|---|---|---|---|
| | | | | COMPOUND NAME | Mw | AMOUNT ADDED (ppm) |
| EXAMPLE 1 | NB | WITH | WITH | POLYALLYLAMINE | 15,000 | 500 |
| EXAMPLE 2 | NB | WITH | WITH | POLYALLYLAMINE | 15,000 | 1,000 |
| EXAMPLE 3 | NB | WITH | WITH | POLYALLYLAMINE | 15,000 | 5,000 |
| COMPARATIVE EXAMPLE 1 | NB | WITH | WITH | WITHOUT | — | — |
| COMPARATIVE EXAMPLE 2 | NB | WITH | WITH | POLYVINYLAMINE | 60,000 | 1,000 |
| COMPARATIVE EXAMPLE 3 | NB | WITH | WITH | GLYCINE | 75 | 1,000 |
| COMPARATIVE EXAMPLE 4 | NB | WITH | WITH | PHENOL | 94 | 1,000 |
| COMPARATIVE EXAMPLE 5 | NB | WITH | WITH | HYDRAZIDE ADIPATE | 174 | 1,000 |
| REFERENCE EXAMPLE 1 | VB | WITH | WITH | WITHOUT | — | — |

TABLE 2

| | ADHERENCE | | HYDROPHILICITY | | ODOR SURPRESSIBILITY | |
|---|---|---|---|---|---|---|
| | INITIAL ARTICLE | DEGRADED ARTICLE | INITIAL ARTICLE | DEGRADED ARTICLE | INITIAL ARTICLE | DEGRADED ARTICLE |
| EXAMPLE 1 | A | A | 18 | 24 | 1.5 | 1.7 |
| EXAMPLE 2 | A | A | 20 | 23 | 1.5 | 1.8 |
| EXAMPLE 3 | A | A | 19 | 25 | 2.0 | 2.0 |
| COMPARATIVE EXAMPLE 1 | B | C | 19 | 20 | 1.8 | 2.5 |
| COMPARATIVE EXAMPLE 2 | C | C | 20 | 20 | 3.5 | 3.3 |
| COMPARATIVE EXAMPLE 3 | C | C | 18 | 20 | 1.9 | 2.5 |
| COMPARATIVE EXAMPLE 4 | C | C | 20 | 20 | 1.8 | 2.5 |
| COMPARATIVE EXAMPLE 5 | C | C | 20 | 20 | 1.6 | 2.5 |
| REFERENCE EXAMPLE 1 | B | C | 19 | 53 | 1.5 | 2.2 |

Table 1 shows that the evaporator for a vehicle air-conditioner treated by the method for surface treating a heat exchanger according to the present invention excelled in odor suppressibility of the foul odor characteristic to flux remaining on the surface of the heat exchanger, since the adherence between the heat exchanger and the coating film having hydrophilicity is maintained over an extended period, and the degradation of the coating film having hydrophilicity and the chemical conversion coating film is suppressed.

In addition, it is found from comparing Comparative Example 1 with Reference Example 1 that, although there is a problem in that the odor suppressibility is conventionally inferior in a heat exchanger manufactured by a vacuum brazing method, the extent of the problem is lower than the problem of odor suppressibility of a non-corrosive flux brazed heat exchanger. It should be noted that, since the flux remaining on the surface of a non-corrosive flux brazed evaporator for a vehicle air-conditioner has hydrophilicity, even if the coating film having hydrophilicity peels off, it will have favorable hydrophilicity compared to an evaporator for a vehicle air-conditioner manufactured by a vacuum brazing method. However, even in such a case, since the base material of the aluminum material on which the flux remains becomes exposed in Comparative Example 1, it is believed that the odor suppressibility is inferior to that of Reference Example 1 due to the odor characteristic to flux. According to the method for surface treating a heat exchanger of the present invention, it is possible to produce a heat exchanger in which the odor suppressibility is favorably retained over an extended period, even in a case of treating such a non-corrosive flux brazed heat exchanger.

INDUSTRIAL APPLICABILITY

The method for surface treating a heat exchanger according to the present invention forms coating films exhibiting hydrophilicity and favorable odor suppressibility against the foul odor characteristic to flux remaining on the surface of the heat exchanger, and the adherence between the heat exchanger and the coating film having hydrophilicity is maintained over an extended period, by causing an acidic cleaning agent containing nitric acid and sulfuric acid as well as a predetermined amount of ferric salt to come into contact with a non-corrosive flux brazed heat exchanger made of an aluminum material, further causing a zirconium-based chemical conversion agent, and causing a surface treatment agent containing silica grains coated by a vinyl alcohol polymer and a polyallylamine resin to come into contact with this, the total content and mass ratio of vinyl alcohol polymer and silica grains being with predetermined ranges. This enables the coating films to be effectively formed/preserved, and the emanation of the foul odor characteristic to flux to be suppressed, even in a non-corrosive flux brazed heat exchanger having residual flux.

What is claimed is:

1. A method for surface treating a heat exchanger, comprising:
   (1) a pickling treatment step of causing an acidic cleaning agent to come into contact with a non-corrosive flux brazed heat exchanger made of an aluminum material;
   (2) a chemical conversion treatment step of causing a zirconium-based chemical conversion treatment agent to come into contact with the aluminum material after the pickling treatment step; and
   (3) a deodorizing treatment step of causing a surface treatment agent to come into contact with the aluminum material after the chemical conversion treatment step,
   wherein the acidic cleaning agent contains nitric acid and sulfuric acid, and contains 0.01 to 0.05% by mass of a ferric salt, and
   wherein the surface treatment agent contains silica grains coated by a vinyl alcohol polymer, and a polyallylamine resin, a total content of the silica grains and the vinyl alcohol polymer contained in the surface treatment agent being in the range of 0.2% by mass to 25% by mass, a mass ratio of the silica grains to the vinyl alcohol polymer being in the range of 30:70 to 70:30, and a content of the polyallylamine resin being the range of 100 ppm to 5000 ppm.

2. The method according to claim 1, wherein the ferric salt is at least one selected from the group consisting of iron sulfate, iron nitrate, iron acetate, and iron chloride.

3. The method according to claim 1, wherein the non-corrosive flux brazed heat exchanger is an evaporator for a vehicle air-conditioner.

* * * * *